United States Patent [19]
Kato et al.

[11] Patent Number: 6,072,929
[45] Date of Patent: *Jun. 6, 2000

[54] DISPERSION-SHIFTED FIBER

[75] Inventors: Takatoshi Kato; Eisuke Sasaoka; Shinji Ishikawa, all of Yokohama, Japan

[73] Assignee: Sumitomo Electric Industries, Ltd., Osaka, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/998,425

[22] Filed: Dec. 24, 1997

[30] Foreign Application Priority Data

Dec. 27, 1996  [JP]  Japan ..................................... 8-350691

[51] Int. Cl.[7] ...................................................... G02B 6/02

[52] U.S. Cl. ............................ 385/123; 385/127; 385/124

[58] Field of Search ...................................... 385/123–128

[56] References Cited

U.S. PATENT DOCUMENTS

| | | | |
|---|---|---|---|
| 4,852,968 | 8/1989 | Reed ........................................ | 385/127 |
| 5,327,516 | 7/1994 | Chraplyvy et al. ...................... | 385/123 |
| 5,483,612 | 1/1996 | Gallagher et al. ....................... | 385/127 |
| 5,684,909 | 11/1997 | Liu .......................................... | 385/127 |
| 5,732,178 | 3/1998 | Terasawa et al. ........................ | 385/127 |
| 5,852,701 | 12/1998 | Kato et al. ............................... | 385/127 |

FOREIGN PATENT DOCUMENTS

| | | |
|---|---|---|
| 689068 | 12/1995 | European Pat. Off. . |
| 0724171A2 | 7/1996 | European Pat. Off. . |
| 2-141704 | 5/1990 | Japan . |

OTHER PUBLICATIONS

P. Nouchi, P. Sansonetti, J. Von Wirth, C. Le Sergent, New Dispersion Shifted Fiber With Effective Area Larger Than 90$\mu m^2$, $22^{nd}$ European Conference on Optical Communications—ECOC'96, Oslo.

Song et al, "A new Scheme in Equally–spaced Channel WDM + EDFA Terrestrial Systems to Depress Fiber Dispersion and FWM Effects", ICCT '96 1996 International Conference on Communication Technology Proceedings (CAT. No. 96TH8118), Beijing, Vhina, 5–7 May 1996, pp. 315–318 vol. 1, XP002106670 New York, NY, USA, IEEE, USA.

Nouchi et al "New Dispersion Shifted With Effective Area Larger than 90 MUM2", Proceedings of the European Conference on Optical Communication, No. 1, 1996, pp. 49–52 52, XP000775986.

Liu et al, "Single–Mode Dispersion–Shifted Fibers with Effective Area Larger than 80 MUM2 and Good Bending Performance", Proceedings of the European Conference on Optical Communication, vol. 1, Sep. 17, 1995, pp. 333–336, XP000646740.

Liu et al, "Single–Mode Dispersion–Shifted Fibers With Effective Area Larger than 80 $\mu m^2$ And Good Bending Performance", Proc. 21st Eur. Conf. on Opt. Comm. (ECOC95–Brussels), 1995, pp. 333–336.

*Primary Examiner*—Phan T. H. Palmer
*Attorney, Agent, or Firm*—Pillsbury Madison & Sutro, LLP

[57] ABSTRACT

The present invention aims to provide a dispersion-shifted fiber which can effectively restrain nonlinear optical effects from occurring and has a configuration suitable for long-haul light transmission. The dispersion-shifted fiber has, as various characteristics at a wavelength of 1,550 nm, a dispersion level of 1.0 to 4.5 ps/nm/km in terms of absolute value, a dispersion slope not greater than 0.13 ps/nm$^2$/km in terms of absolute value, an effective core cross-sectional area not less than 70 $\mu m^2$, and a transmission loss not greater than 0.25 dB/km with respect to light in a 1.55-$\mu$m wavelength band.

18 Claims, 8 Drawing Sheets

CUTOFF WAVELENGTH AT 2m LENGTH ($\mu$m)

$\Delta n_2$ (%)

TRANSMISSION LOSS (@1550nm) (dB/km)

($\Delta n_3 / \Delta n_2$)

32mm-DIA BENDING LOSS (dB/TURN)

$c/b$

DISPERSION-SHIFTED FIBER

BACKGROUND OF THE INVENTION

1. Field of the Invention

The present invention relates to a single mode optical fiber (hereinafter referred to as S-mode optical fiber) used for transmitting light in long-haul optical communications or the like and, in particular, to a dispersion-shifted fiber suitable for wavelength-multiplexing transmission.

2. Related Background Art

Conventionally, optical communication systems employing a S-mode optical fiber as their transmission line have often utilized light in the wavelength band of 1.3 µm or 1.55 µm as their signal light for communications. Recently, in order to reduce transmission loss in the transmission line, the light in the wavelength band of 1.55 µm has been in use more and more. The S-mode optical fiber employed in such a transmission line for light in the wavelength band of 1.55 µm (hereinafter referred to as 1.55-µm S-mode optical fiber) has been designed such that its wavelength dispersion (phenomenon in which pulse wave spreads due to the fact that velocity of propagation of light changes depending on its wavelength) is nullified (namely, to yield a dispersion-shifted fiber whose zero-dispersion wavelength is 1.55 µm). For example, as such a dispersion shifted fiber, Japanese Patent Publication No. 3-18161 discloses a dispersion-shifted fiber having a dual-shape core type refractive index profile in which a core is constituted by an inner core layer and an outer core layer having a refractive index lower than that of the inner core layer. Further, Japanese Patent Application Laid-Open No. 63-43107 and No. 2-141704 propose a dispersion-shifted fiber having a depressed cladding/dual-shape core type refractive index profile in which, in addition to the double core structure mentioned above, a cladding is constituted by an inner cladding layer and an outer cladding layer having a refractive index higher than that of the inner cladding layer.

On the other hand, long-haul light transmission has recently become possible with the advent of wavelength division multiplex (WDM) transmission and optical amplifiers. Under such circumstances, however, influences of nonlinear optical effects cannot be neglected. Accordingly, in order to eliminate the nonlinear optical effects, it has been proposed to deform the refractive index profiles mentioned above, thereby shifting their zero-dispersion wavelength toward the shorter or longer wavelength side of their signal wavelength band (Japanese Patent Application Laid-Open No. 7-168046 and U.S. Pat. No. 5,483,612). Here, a nonlinear optical effect is a phenomenon in which a signal light pulse is distorted in proportion to density of light intensity or the like. This phenomenon becomes a factor restricting transmission speed, as well as a relay distance in a relaying transmission system.

SUMMARY OF THE INVENTION

As a result of studies concerning the above-mentioned prior art, the inventors have discovered the following problems. Namely, in the above-mentioned dispersion-shifted fibers proposed for wavelength division multiplex transmission, the zero-dispersion wavelength is set to a level different from the wavelength level of signal wavelength band so as to restrain nonlinear optical effects from occurring, while their effective core cross-sectional area $A_{eff}$ is set on the order of 55 $\mu m^2$. Though the conventional dispersion-shifted fibers for wavelength division multiplex transmission are sufficient for the conventional applications, it may be difficult for the prior art to keep a suitable transmission quality in the conventional transmission distance in view of further advance in wavelength multiplexing which will occur as communications become more sophisticated.

Here, as disclosed in Japanese Patent Application Laid-Open No. 8-248251, effective core cross-sectional area $A_{eff}$ is given by the following expression:

$$A_{eff} = 2\pi \left( \int_0^\infty E^2 r dr \right)^2 / \left( \int_0^\infty E^4 r dr \right)$$

wherein E is an electric field accompanying propagated light, and r is a radial distance from a core center.

It is an object of the present invention to provide a dispersion-shifted fiber which can effectively restrain the nonlinear optical effects from occurring, and is suitable for long-haul light transmission.

The dispersion-shifted fiber according to the present invention is a S-mode optical fiber mainly composed of silica glass, whose zero-dispersion wavelength is shifted toward the shorter or longer wavelength side of a signal light wavelength band. The object to be transmitted through the dispersion-shifted fiber according to the present invention is at least one light component whose center wavelength is within the range of 1,500 to 1,600 nm (signal light wavelength band). In this specification, light in a 1.55-µm wavelength band equals to light in the signal light wavelength band. The dispersion-shifted fiber has a zero-dispersion wavelength out of a wavelength band of 1.53 µm (1,530 nm) to 1.56 µm (1,560 nm) and has, as various characteristics at 1,550 nm, a dispersion level of 1.0 to 4.5 ps/nm/km in terms of absolute value, a dispersion slope not greater than 0.13 ps/nm²/km in terms of absolute value, an effective core cross-sectional area $A_{eff}$ of 70 $\mu m^2$ or more, and a transmission loss not greater than 0.25 dB/km with respect to light in a wavelength band of 1.55 µm.

Here, when the dispersion level in terms of absolute value is smaller than 1.0 ps/nm/km, waveform distortion caused by four-wave mixing, unstable modulation, and the like cannot practically be neglected in long-haul light transmission over 20 km or more. When the dispersion level in terms of absolute value is greater than 4.5 ps/nm/km, by contrast, waveform distortion caused by wavelength dispersion and by self phase modulation cannot practically be neglected in long-haul light transmission over 20 km or more.

In the dispersion-shifted fiber according to the present invention, the absolute value of dispersion slope is not greater than 0.13 ps/nm²/km. Accordingly, is it possible to transmit signal lights in which the variation in the amount of waveform distortion due to the dispersion wavelength in signal lights is effectively decreased.

The amount of nonlinear optical effects generated is in proportion to nonlinear optical effect constant ($N_2/A_{eff}$). Accordingly, at the same propagating light condition, nonlinear optical effects are effectively restrained from occurring when the nonlinear optical offset constant ($N_2/A_{eff}$) is made smaller. On the other band, since nonlinear refractive index $N_2$ is substantially defined by a main material of the optical fiber, it is difficult for the optical fiber made of the same main material to change the nonlinear refractive index $N_2$ from its conventional level so as to restrain the nonlinear optical effects from occurring.

Therefore, in the dispersion-shifted fiber according to the present invention, the effective core cross-sectional area $A_{eff}$ is increased to 70 $\mu m^2$ or greater, thereby the amount of nonlinear optical effects generated becomes smaller than that of the conventional dispersion-shifted fiber by at least 20%.

FIG. 1 is a graph showing a relationship between effective core cross-sectional area $A_{eff}$ and nonlinear optical constant ($N_2/A_{eff}$) in a dispersion-shifted fiber having a typical composition. From FIG. 1, it can be seen that nonlinear optical constant ($N_2/A_{eff}$), which is $5.8 \times 10^{-10}$ (1/W) when effective core cross-sectional area $A_{eff}$ is 55 $\mu m^2$, becomes $4.6 \times 10^{10}$ (1/W) when effective core cross-sectional area $A_{eff}$ is 70 $\mu m^2$, thus being reduced by about 20%. Accordingly, as compared with the conventional dispersion-shifted fiber, the dispersion-shifted fiber according to the present invention can increase the degree of wavelength multiplexing is signal light.

in general, refractive index N of a medium under strong light changes depending on light intensity. Accordingly, the minimum order of effect on refractive index N is expressed by:

$$N = N_0 + N_2 \cdot E^2$$

wherein $N_0$ is a linear refractive index, N, is a nonlinear refractive index, and E is a field amplitude. Namely, under strong light, the refractive index N of the medium is given by the sum of $N_0$ and an increase which is in proportion to the square of field amplitude E. In particular, the constant of proportion $N_2$ (unit: $m^2/V^2$) in the second term is known as nonlinear refractive index. Since the distortion in signal light pulse is mainly influenced by, of nonlinear refractive indices, the nonlinear refractive index in the second term, nonlinear refractive index in this specification mainly refers to this second-order nonlinear refractive index.

Also, in the dispersion-shifted fiber according to the present invention, since its incident signal light power can be increased by about 20% (about 1dB) as compared with the conventional dispersion-shifted fiber, signal light can be transmitted over a transmission distance longer than that of the conventional fiber by 5 km when transmission less is assumed to be 0.2 dB/km. As a result, in the case where the conventional repeater spacing is 50 km, for example, the number of repeaters can be reduced by about 10%.

Further, the dispersion-shifted fiber according to the present invention has a bending loss of 0.5 dB/turn or less when bent at a diameter of 32 mm. Here, the bending loss is measured in a state where a fiber to be measured is wound around a mandrel having a diameter of 32 mm, and a value thus obtained is expressed per turn.

In general, the greater is effective core cross-sectional area $A_{eff}$, the higher becomes the density of light intensity on the outer periphery side, thus yielding a greater bending loss. An optical fiber with a greater bending inevitably generated by cable-forming step, cable-laying step, excess-length processing upon connection, and the like. The dispersion-shifted fiber according to the present invention has a bending loss of 0.5 dB/turn or less when bent at a diameter of 32 mm, thereby effectively suppressing the optical loss caused by the bending generated at the cable-forming step or the like.

Preferably, in the dispersion-shifted fiber according to the present invention, the absolute value of dispersion slope is 0.09 ps/nm²/km or more. The smaller the dispersion slope is, the less becomes the variation in the amount of waveform distortion caused by wavelength dispersion in the signal lights. On the other hand, the smaller the dispersion slope is, the more likely satisfied is a phase-matching condition for generating the four-wave mixing that is one of nonlinear optical phenomena. Therefore, in the dispersion-shifted fiber according to the present invention, the absolute value of dispersion slope is preferably at least 0.09 ps/nm²/km but not greater than 0.13 ps/nm²/km, so as to restrain not only the variation in the amount of waveform distortion caused by wavelength dispersion, but also the occurrence of the four-wave mixing, while the signal lights are transmitted.

In order to realize the foregoing characteristics, the dispersion-shifted fiber according to the present invention can be realized by dual-shape core type or segmented-core type refractive index profile. Both refractive index profiles have a depressed cladding structure.

Here, a first embodiment of the dispersion-shifted fiber according to the present invention has a depressed cladding/dual-shape core type refractive index profile. The first embodiment of the dispersion-shifted fiber comprises an inner core having a predetermined refractive index and an outside diameter of 2a; an outer core, disposed around the outer periphery of the inner core, having a refractive index lower than that of the inner core and an outside diameter of 2b; an inner cladding, disposed around the outer periphery of the outer core, having a refractive index lower than that of the outer core; and an outer cladding, disposed around the outer periphery of the inner cladding, having a refractive index higher than that of the inner cladding.

According to the findings obtained by the inventors as a result of studies, when effective core cross-sectional area $A_{eff}$ is increased in a dispersion-shifted fiber having a simple dual-shape core type refractive index profile without a depression cladding structure, namely, non-depressed cladding/dual-shape core type refractive index profile, in a state where its absolute value of dispersion is set to 1.0 to 4.5 ps/nm/km at the wavelength of 1,550 nm, its cutoff wavelength becomes shorter, and its bending loss increases. Even when the refractive index profile is adjusted to increase the cutoff wavelength in order to reduce the bending loss, due to the restriction that the cutoff wavelength must not exceed the signal light wavelength, the bending loss can not sufficiently be ameliorated.

Also, according to the findings of the inventors, when the bending loss of a dispersion-shifted fiber having a depressed cladding/dual-shape core type refractive index is lower than that of a dispersion-shifted fiber having a simple dual-shape core type refractive index. Accordingly, an optical fiber (having a depressed cladding/dual-shape core type refractive index profile) employing the configuration mentioned above can favorably realize the foregoing various characteristics, and suppress the bending loss to a predetermined level or lower.

Preferably, the first embodiment of the dispersion-shifted fiber satisfies the following relationships:

$a/b \leq 0.15$ (1)

$0.8\% \leq \Delta n_1 \leq 1.2\%$ (2)

$0.12\% \leq \Delta n_2 \leq 0.30\%$ (3)

$\Delta n_1/n_2 \leq 0.95$ (4)

wherein $\Delta n_1$ is a relative refractive index difference of the inner core with respect to the inner cladding, $\Delta n_1$ is a relative refractive index difference of the outer core with respect to the inner cladding, and $\Delta n_1$ is a relative refractive index difference of the outer cladding with respect to the inner cladding.

The dispersion-shifted fiber satisfying these relationships can favorably realize the foregoing various characteristics, and allows its absolute value of dispersion slope to become at least 0.09 ps/nm²/km but not larger than 0.13 ps/nm²/km.

Here, the relative refractive index difference $\Delta n_1$ of the inner core with respect to the inner cladding, relative refractive index difference $\Delta n_2$ of the outer core with respect to the inner cladding, and relative refractive index difference $\Delta n_1$ of the outer cladding with respect to the inner cladding are respectively defined as follows:

$$\Delta n_1 = (n_1^2 - n_3^2)/(2n_1^2) \quad (5)$$

$$\Delta n_1 = (n_2^2 - n_3^2)/(2n_2^2) \quad (6)$$

$$\Delta n_3 = (n_3^2 - n_3^2)/(2n_4^2) \quad (7)$$

wherein $n_1$ is the refractive index of the inner core, $n_2$ is the refractive index of the outer core, $n_3$ is the refractive index of the inner cladding, and $n_4$ is the refractive index of the outer cladding. In this specification, each relative refractive index difference is expressed in terms of percentage.

Preferably, the first embodiment of the dispersion-shifted fiber further satisfies the following relationship:

$$1.2 \leq c/b \leq 3.5 \quad (8)$$

wherein 2c is an outside diameter of the inner cladding.

The above relationship is preferable in view of the fact that, in the first embodiment of the dispersion-shifted fiber, the bending-loss-reducing effect, which is generated by the existence of the inner cladding, can not sufficiently be yielded when the inner cladding is too thin. On the other hand, when the inner cladding is too thick, it functions in a way similar to a normal cladding and fails to yield the cutoff-wavelength-shortening effect of the depressed cladding type refractive index. When the dispersion-shifted fiber satisfies the relationship of $c/b \geq 1.2$, the bending loss in the case where it is bent at a diameter of 32 nm can become 0.5 dB/turn or less.

On the other hand, as the first embodiment of the dispersion-shifted fiber satisfies the relationship of $c/b \leq 3.5$, its cutoff wavelength can favorably be made shorter, thereby making it easy to secure a wavelength range of signal light which allows single-mode transmission.

next, a second embodiment of the dispersion-shifted fiber according to the present invention has a depressed cladding/segmented-core type refractive index profile. The second embodiment of the dispersion-shifted fiber comprises an inner core having a predetermined refractive index and an outside diameter of 2a; an intermediate core, disposed around the outer periphery of the inner core, having a refractive index lower than that of the inner core and an outside diameter of 2b; an outer core, disposed around the outer periphery of the intermediate core, having a refractive index higher than that f the intermediate core and an outside diameter of 2c; an inner cladding, disposed around the outer periphery of the outer core, having a refractive index lower than that of the outer core; and an outer cladding, disposed around the outer periphery of the inner cladding, having a refractive index higher than that of the inner cladding.

preferably, the second embodiment of the dispersion-shifted fiber satisfies the following relationships:

$$a/c \leq 0.42 \quad (9)$$

$$b/c \geq 0.60 \quad (10)$$

$$0.5\% \leq \Delta n_1 \leq 1.1\% \quad (11)$$

$$0.2\% < \Delta n_0 - \Delta n_2 \leq 0.7\% \quad (12)$$

$$\Delta n_4/\Delta n_3 \leq 0.95 \quad (13)$$

wherein $\Delta n_1$ is a relative refractive index difference of said inner core with respect to said inner cladding, $\Delta n_2$ is a relative refractive index difference of said intermediate core with respect to said inner cladding, $\Delta n_5$ is a relative refractive index difference of said outer core with respect to said inner cladding, and $\Delta n_4$ is a relative refractive index difference of said outer cladding with respect to said inner cladding.

The above-relationships (9) and (10) are conditions to satisfy the effective core cross-section area $A_{eff}$ of 70 $\mu m^2$. The relative refractive index difference $\Delta n_1$ of said inner core with respect to said inner cladding is preferably 0.5% or more in order to satisfy the condition that the dispersion level in terms of absolute value falls within 1.0 to 4.5 ps/nm/km. Further, when the relative index difference $\Delta n_1$ is 1.1% or less, the dispersion slope at wavelength of 1,550 nm falls within a range of 0.09 to 0.13 ps/nm²/km. The value $(\Delta n_3 - \Delta n_2)$ should be 0.2% or more in order to satisfy the condition that the bending loss when bent at a diameter of 32 mm becomes 0.5 dB/turn or less, and it should be 0.7% or less in order to make cutoff wavelength at a length of 2 m set 2.2 $\mu m$ or less. The relationship (13) is a condition to restrain the transmission loss with respect to light in a 1.55-$\mu m$ wavelength band so as not to exceed 0.25 dB/km.

Further, the second embodiment of the dispersion-shifted fiber satisfies the following relationship:

$$1.2 \leq d/c \leq 3.5 \quad (14)$$

wherein 2d is an outside diameter of the inner cladding.

The bending loss when bent at a diameter of 32 mm becomes 0.5 dB/km or less when (d/c) is not less than 1.2, and the reducing effect of the cut off wavelength becomes saturated when (d/c) exceeds 3.5.

The present invention will be more fully understood from the detailed description given hereinbelow and the accompanying drawings, which are given by way of illustration only and are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will be apparent to those skilled in the art from this detailed description.

BRIEF DESCRIPTION OF THE DRAWINGS

FIG. 9 is a graph showing a relationship between value (c/b) and bending loss generated when bent at a diameter of 32 mm;

DESCRIPTION OF THE PREFERRED EMBODIMENTS

In the following, the dispersion shifted fiber according to the present invention will be explained with reference to FIGS. 2 to 11. In the explanation of drawings, elements identical to each other will be referred to with numerals or letters identical to each other, without their overlapping descriptions being repeated.

Figure 1:
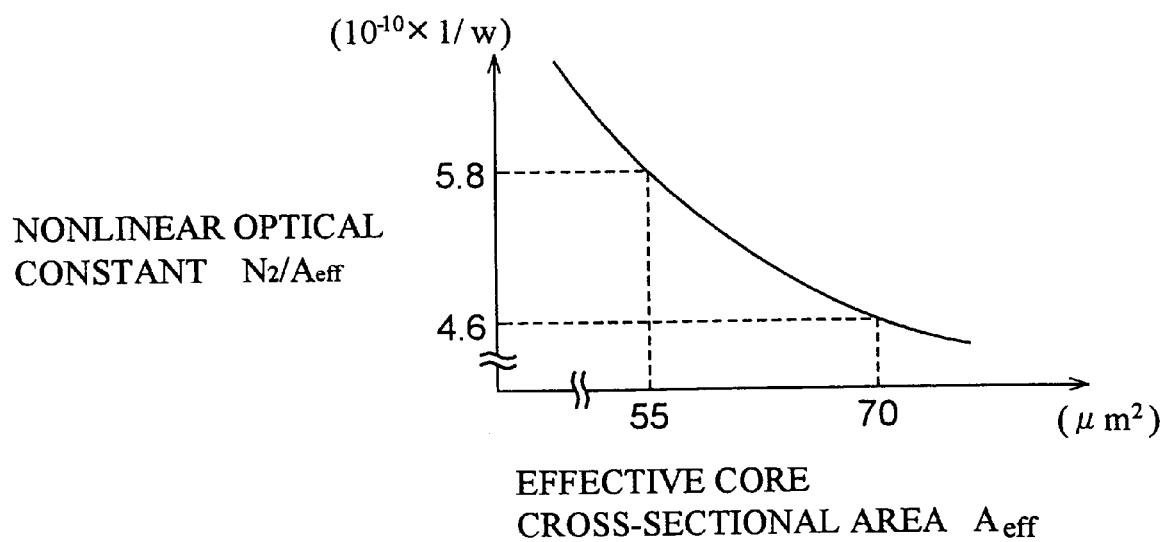
FIG. 1 is a graph showing an example of relationship between effective core cross-sectional area $A_{eff}$ and nonlinear optical constant $(N_2/A_{eff})$.
Figure 2:
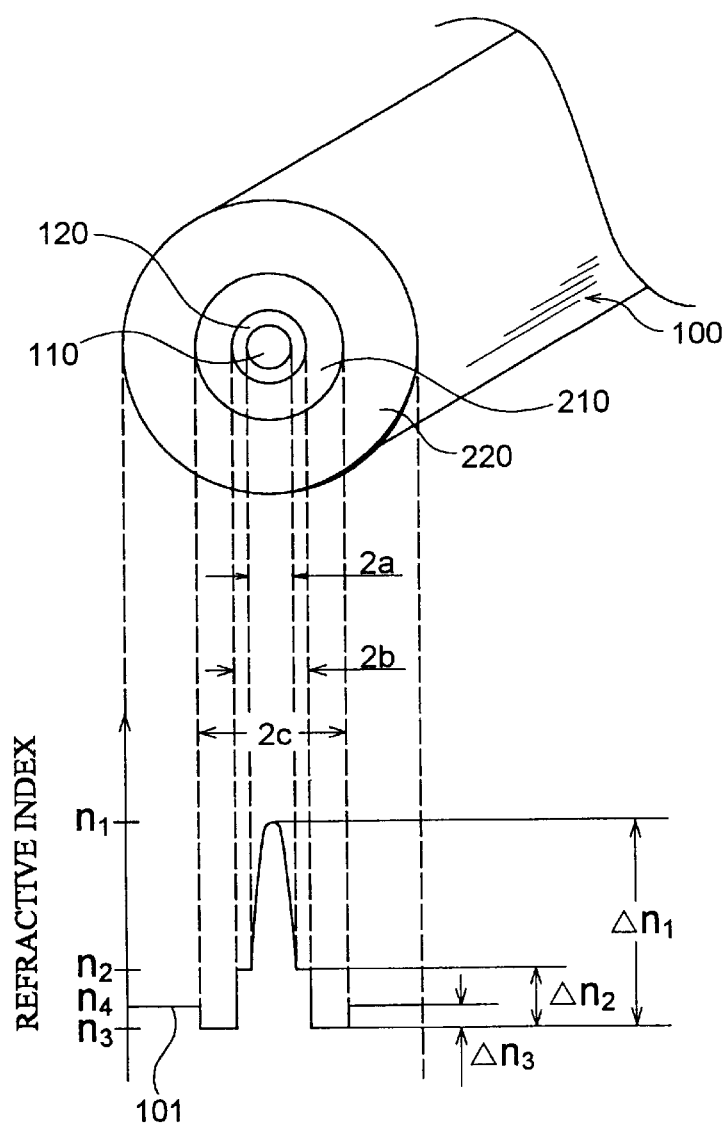
FIG. 2 is a view showing a cross-sectional configuration of a typical embodiment of the dispersion-shifted fiber according to the present invention and its refractive index profile (depressed cladding/dual-shape core type)

FIG. 2 is a view showing a cross-sectional configuration of a typical embodiment of the dispersion-shifted fiber according to the present invention and its refractive index profile. As shown in FIG. 2, this dispersion-shifted fiber 100 comprises an inner core 110 having a refractive index $n_1$ as its maximum refractive index and an outside diameter 2a; an outer core 120, disposed around the outer periphery of the inner core 110, having a refractive index $n_2$ ($<n_1$) and an outside diameter 2b; an inner cladding 210, disposed around the outer periphery of the outer core 120, having a refractive index $n_3$ ($<n_2$) and an outside diameter 2c; and an outer cladding 220, disposed around the outer periphery of the inner cladding 210, having a refractive index $n_4$ ($>n_3$). As a result of this configuration, the dispersion-shifted fiber 100 realizes a depressed cladding/dual-shape core type refractive index profile 101.

This dispersion-shifted fiber satisfies the following relationships:

$a/b \leq 0.15$ (1)

$0.8\% \leq \Delta n_1 \leq 1.2\%$ (2)

$0.12\% \leq \Delta n_1 0.30\%$ (3)

$\Delta n_3/\Delta n_2 \leq 0.95$ (4)

$1.2 \leq c/b \leq 3.5$ (8)

wherein $\Delta n_1$ is a relative refractive index difference of the inner core 110 with respect to the inner cladding 210, $\Delta n_2$ is a relative refractive index difference of the other core 120 with respect to the inner cladding 210, and $\Delta n_3$ is a relative refractive index difference of the outer cladding 220 with respect to the inner cladding 210.

Figure 3:
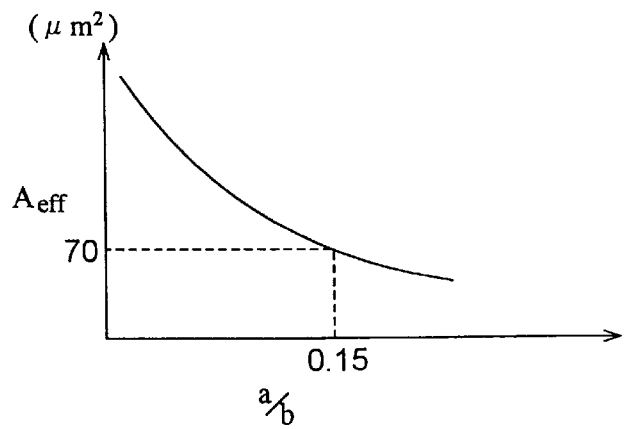
FIG. 3 is a graph showing a relationship between value (a/b) and effective core cross-sectional area $A_{eff}$.

FIG. 3 is a graph showing a relationship between the ratio of outside diameter 2a of the inner core 110 to outside diameter 2b of the outer core 120 and effective core cross sectional area $A_{eff}$. In FIG. 3, while $\Delta n_1$ is 1.0% and $\Delta n_2$ is 0.2%, the outside diameter 2a and the outside diameter 2b of the inner core 110 are changed so as to attain a zero-dispersion wavelength of 1,580 nm. It can be seen from FIG. 3 that $A_{eff}$ becomes 70 $\mu m^2$ or more when (a/b) does not exceed 0.15.

Figure 4:
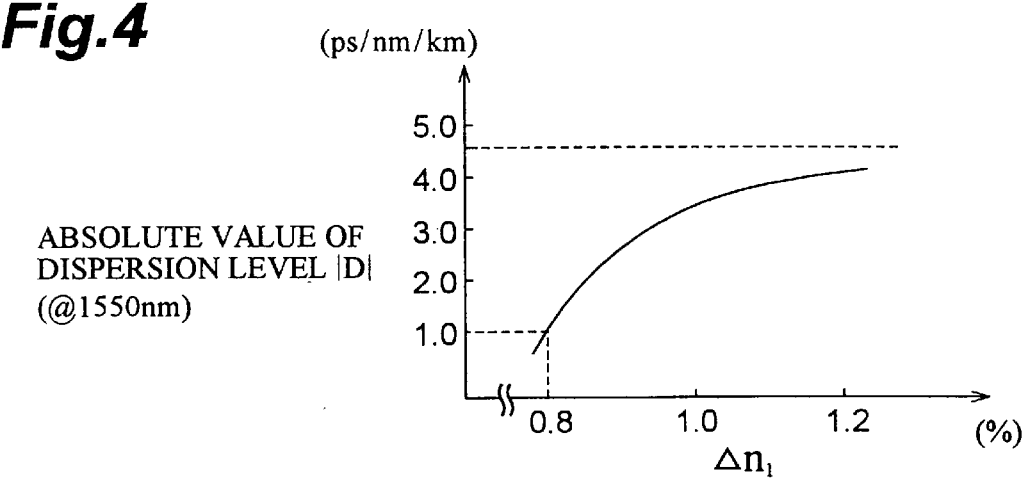
FIG. 4 is a graph showing a relationship between relative refractive index difference $\Delta n_1$ and absolute value |D| of dispersion level D with respect to light having a wavelength of 1,550 nm.

FIG. 4 is a graph showing a relationship between the relative refractive index difference $\Delta n_1$ of the inner core 110 with respect to the inner cladding 210 and absolute value |D| of dispersion level D with respect to light having a wavelength of 1,550 nm. In FIG. 4, the outside diameter 2a of the inner core 110, outside diameter 2b of the outer core 120, relative refractive index difference $\Delta n_1$ of the inner core 110 with respect to the inner cladding 210, and relative refractive index difference $\Delta n_1$ of the outer core 120 with respect to the inner cladding 210 are changed so as to satisfy that (a/b) is 0.13 and $A_{eff}$ is 80 $\mu m^2$. It can be seen from FIG. 4 that |D| is equal to or larger than 1.0 ps/nm/km when $\Delta n_1$ exceeds 0.8%, and that |D| is equal to or smaller than 4.5 ps/nm/km when $\Delta n_2$ is approximately 1.2%.

Figure 5:
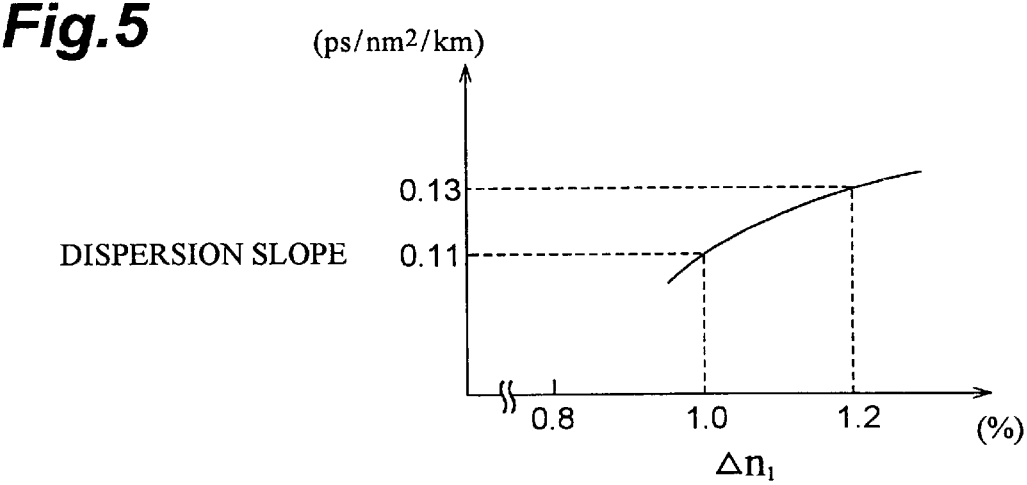
FIG. 5 is a graph showing a relationship between relative refractive index difference $\Delta n_1$ and dispersion slope.

FIG. 5 is a graph showing a relationship between the relative refractive index difference $\Delta n_1$ of the inner core 110 with respect to the inner cladding 210 and dispersion slope. In FIG. 5, the outside diameter 2a of the inner core 110, outside diameter 2b of the outer core 120, relative refractive index difference $\Delta n_1$ of the inner core 110 with respect to the inner cladding 210, and relative refractive index difference $\Delta n_2$ of the outer core 120 with respect to the inner cladding 210 are changed so as to satisfy 0.13 of (a/b), 80 $\mu m^2$ of $A_{eff}$, 0.13 ;s/nm²/km or more when $\Delta n_1$ is equal to or greater than 1.2%.

Figure 6:
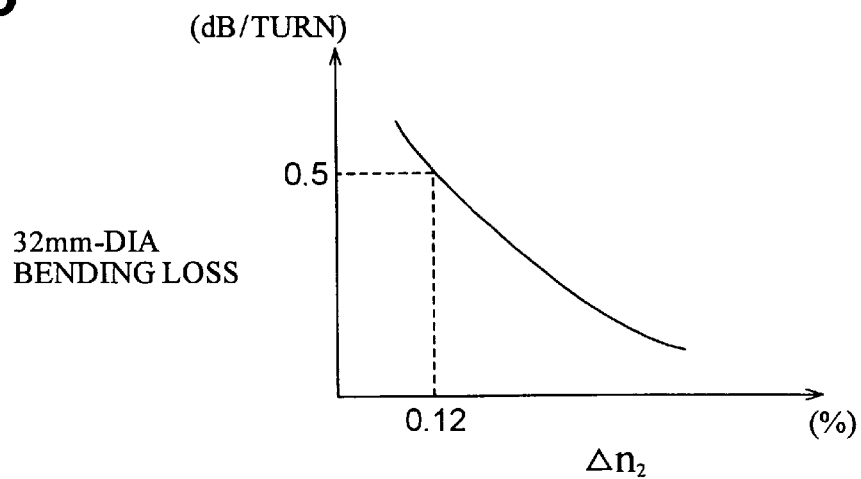
FIG. 6 is a graph showing a relationship between relative refractive index difference $\Delta n_2$ and bending loss generated when bent at a diameter of 32 mm.

FIG. 6 is a graph showing a relationship between the relative refractive index difference $\Delta n_2$ of the outer core 120 with respect to the inner cladding 210 are changed so as to satisfy that relative refractive index difference $\Delta n_1$ is 1.0% in the inner core 110 with respect to the inner cladding 210, (a/b) is 0.13, $A_{eff}$ is 80 $\mu m^2$, and zero-dispersion wavelength is 1,580 nm. It can be seen from FIG. 6 that the bending loss upon bending at a diameter of 32 mm is 0.5 dB/turn or less when $\Delta n_2$ is equal to or greater than 0.12%. Here, the bending loss is measured as a fiber to be measured is wound around a mandrel having a diameter of 32 mm by a predetermined number of turns (e.g., 100 turns), and is given by a value obtained when thus measure d value is expressed per turn.

Figure 7:
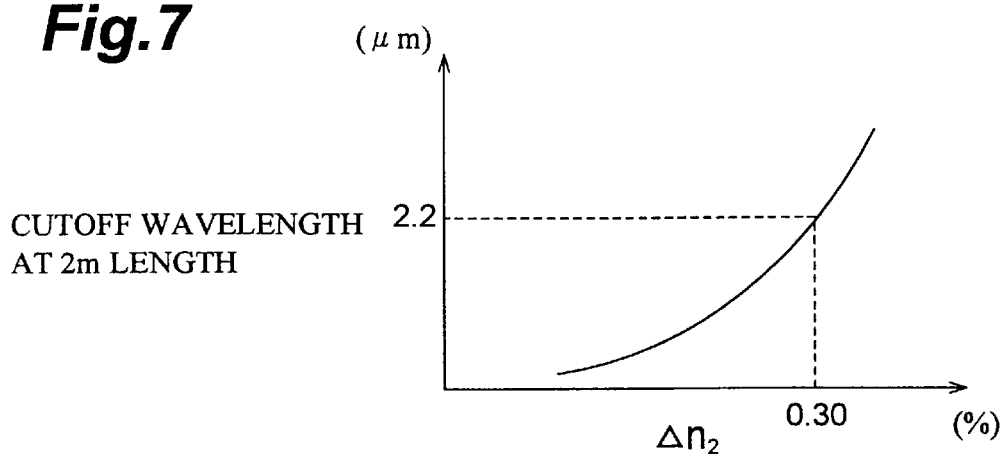
FIG. 7 is a graph showing a relationship between relative refractive index difference $\Delta n_2$ and cutoff wavelength at a reference length of 2 m.

FIG. 7 is a graph showing a relationship between the relative refractive index difference $\Delta n_2$ of the outer core 120 with respect to the inner cladding 210 and cutoff wavelength at a reference length of 2 m. In FIG. 7, the outside diameter 2a of the inner core 110, outside diameter 2b of the outer core 120, relative refractive index difference $\Delta n_2$ of the outer core 120 with respect to the inner cladding 210, and relative refractive index difference $\Delta n_2$ of the outer core 120 with respect to the inner cladding 210, and relative refractive index difference $\Delta n_1$ of the outer cladding 220 with respect to the inner cladding 210 are changed so as to satisfy that $\Delta n_1$ is 1.0% in the inner core 110 with respect to the inner cladding 210, (a/b) is 0.13, $A_{eff}$ is 80 $\mu m^2$, zero-dispersion wavelength is 1,580 nm, and $\Delta n_3/\Delta n_2$ is 0.8.

Normally, cutoff wavelength $\lambda_c$ of an optical fiber is measured according to a bending process performed at a length of 2 m, which is recommended by CCITT-G.650. When a S-mode optical fiber has a length L or 2 m, the cutoff wavelength $\lambda_c$, as the lowest wavelength allowing single-mode transmission, coincides with the result of the above-mentioned measurement. It has been known that, as the length L increases, the cutoff wavelength $\lambda_c$ changes according to the following expression (15):

$$\lambda_c(L)=\lambda_c(L_0=2\ m)-0.184\times\log_{10}(L/L_0) \quad (15)$$

(see T. Kato et al., *OECC 96 Technical Digest,* July 1966, Makuhari Messe, pp. 160–161).

On the other hand, the dispersion-shifted fiber according to the present invention is assumed to transmit signal light having a wavelength in the band of 1.55 µm over a long distance of 20 ,m or more. Consequently, it is necessary for the cutoff wavelength $\lambda_c(L_o)$ at a length of 2 m to satisfy the following expression (16):

$$\lambda_c(L)\leq 1.5+0.732\ [\mu m]=2.3\ \mu m \quad (16)$$

From FIG. 7, it can be seen that the cutoff wavelength $\lambda_c(L_o)$ is equal to or less than 2.2 µm at a length of 2 m when $\Delta n_2 \leq 0.30\%$.

Figure 8:
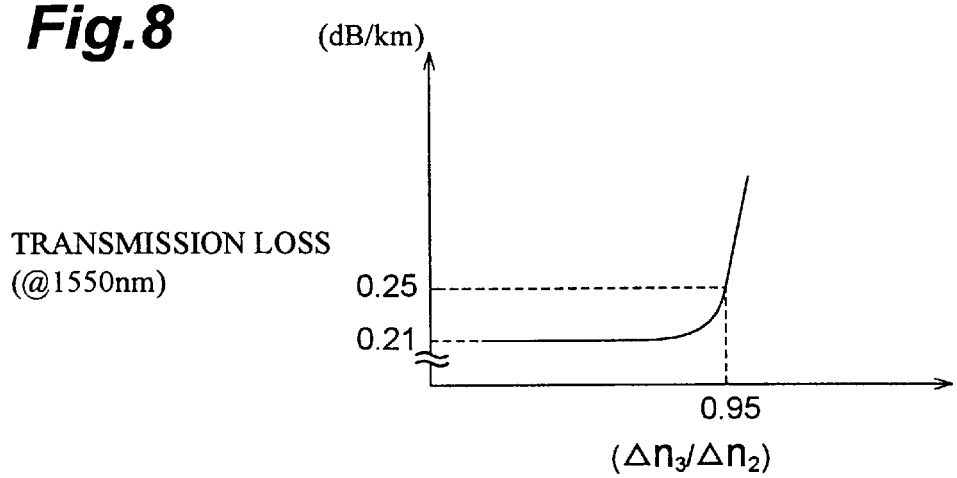
FIG. 8 is a graph showing a relationship between value $(\Delta n_3/\Delta n_2)$ and transmission loss.

FIG. 8 is a graph showing a relationship between value $(\Delta n_3/\Delta n_2)$ and transmission loss. In FIG. 8, the relative refractive index difference $\Delta n_3$ of the outer cladding 220 with respect to the inner cladding 210 is changed under the following conditions:

relative refractive index difference $\Delta n_1=1.0\%$;

relative refractive index difference $\Delta n_2=0.20\%$; and (a/b)=0.13.

It can be seen from FIG. 8 that transmission loss drastically increases beyond 0.25 dB/km when $(\Delta n_3/\Delta n_2)$ is greater than 0.95.

Figure 9:
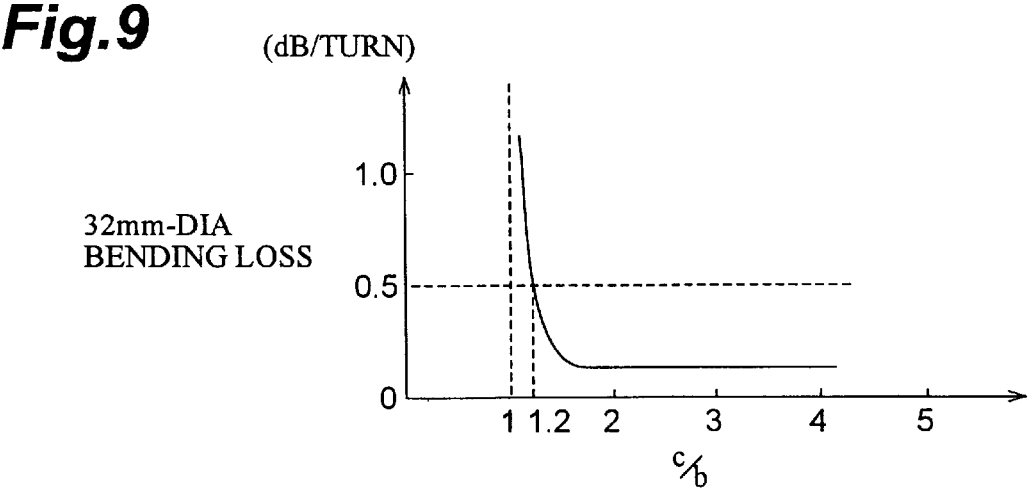
FIG. 9 is a graph showing a relationship between value $(\Delta n_3/\Delta n_2)$ and transmission loss.

FIG. 9 is a graph showing a relationship between value (c/b) and banding loss at a diameter of 32 mm. In FIG. 9, and outside diameter 2c of the inner cladding 210 is changed under the following conditions:

relative refractive index difference $\Delta n_1=1.0\%$;

relative refractive index difference $\Delta n_2=0.20\%$;

relative refractive index difference $\Delta n_3=0.12\%$;

radius a $=2.1$ µm; and radius b is 16.0 µm.

It can be seen from FIG. 9 that the bending loss generated when bent at a diameter of 32 mm drastically increases beyond 0.5 dB/turn when (c/b) does not exceed 1.2.

Figure 10:
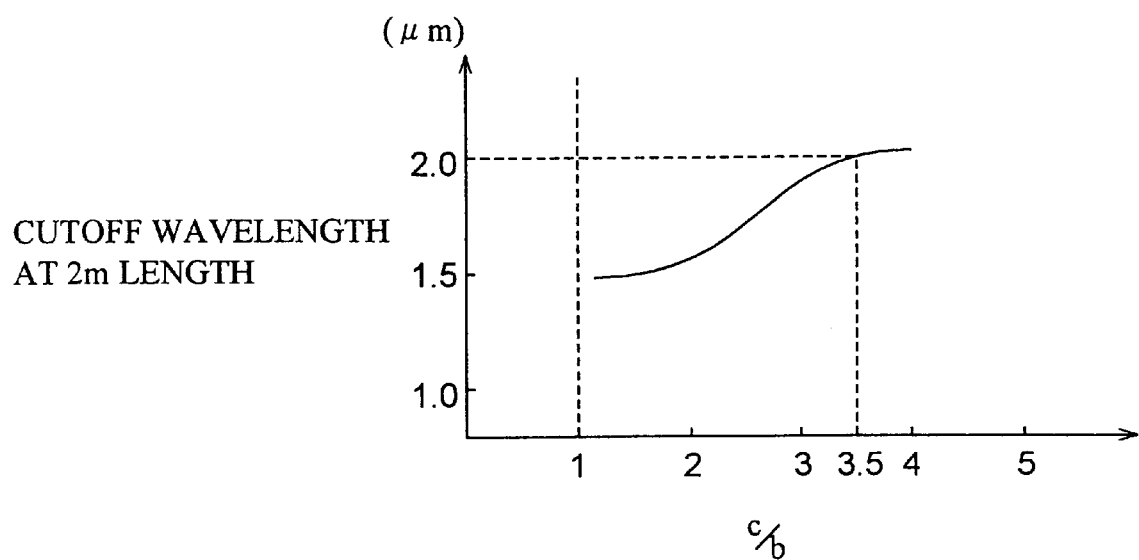
FIG. 10 is a graph showing a relationship between value (c/b) and cutoff wavelength at a reference length of 2 m.

FIG. 10 is a graph showing a relationship between value (c/b) and cutoff wavelength at a length of 2 m. In FIG. 10, the outside diameter 2c of the inner cladding 210 is changed under the following conditions:

relative refractive index difference $\Delta n_1=1.0\%$;

relative refractive index difference $\Delta n_2=0.20\%$;

relative refractive index difference $\Delta n_3=0.12\%$;

radius a=2.1µm; and radius b=16.0 µm.

It can be seen from FIG. 10 that the effect on lowering cutoff wavelength is saturated when (c/b) does not exceed 3.5.

Namely, when the dispersion-shifted fiber according to the present invention has a depressed cladding/dual-shape core type refractive index profile, it satisfies the following relationships:

$$a/b \leq 0.15 \quad (1)$$

$$0.8\% \leq \Delta n_1 \leq 1.2\% \quad (2)$$

$$0.12\% \leq \Delta n_2 \leq 0.03\% \quad (3)$$

$$\Delta n_3/\Delta n_2 \leq 0.95 \quad (4)$$

$$1.2 \leq c/b \leq 3.5 \quad (8)$$

Accordingly, it favorably satisfies, at the wavelength of 1,550 nm, various characteristics such as a dispersion level of 1.0 to 4.5 ps/nm/km in terms of absolute value, a dispersion slope not greater than 0.13 ps/nm$^2$/km in terms of absolute value, an effective core cross-sectional area $A_{\mathit{eff}}$ of 70 µm$^2$ or more, a transmission loss not greater than 0.25 dB/km with respect to light in the wavelength band of 1.55 µm, and a bending loss of 0.5 dB/turn or less when bent at a diameter of 32 mm.

Thus, favorably realized is a dispersion-shifted fiber which can effectively restrain nonlinear optical effects from occurring and is suitable for long-haul light transmission.

On the other hand, without being restricted to the foregoing dispersion shifted fiber having a depressed cladding/dual-shape core type refractive index profile, the present invention can be embodied in various manners. For example, the dispersion-shifted fiber can be applied to a dispersion-shifted fiber having a segmented-core type refractive index profile as follows.

The dispersion-shifted fiber having a segmented-core type refractive index profile comprises an inner core having a predetermined refractive index and an outside diameter of 2a; an intermediate core, disposed around the outer periphery of the inner core, having a refractive index lower than that of the inner core and an outside diameter of 2b; and outer core, disposed around the outer periphery of the intermediate core, having a refractive index higher than that of the intermediate core and an outside diameter of 2c; and inner cladding, disposed around the outer periphery of the outer core, having a refractive index lower than that of the outer core and an outside diameter of 2d; and an outer cladding, disposed around the outer periphery of the inner cladding, having a reflective index higher than that of the inner cladding.

Accordingly, the dispersion-shifted fiber having the above-mentioned various characteristics should satisfy the following relationships:

$$a/c<0.42 \quad (9)$$

$$b/c \geq 0.60 \quad (10)$$

$$0.5\% \leq \Delta n_1 \leq 1.1\% \quad (11)$$

$$0.2\% \leq \Delta n_3 - \Delta n_2 \leq 0.7\% \quad (12)$$

$$\Delta n_4/\Delta n_3 \leq 0.95 \quad (13)$$

$$1.2 \leq d/c \leq 3.5 \quad (14)$$

wherein $\Delta n_1$ is a relative refractive index difference of said inner core with respect to said inner cladding, $\Delta n_2$ is a relative refractive index difference of said intermediate core with respect to said inner cladding, $\Delta n_3$ is a relative refractive index difference of said outer core with respect to said inner cladding, and $\Delta n_4$ is a relative refractive index difference of said outer cladding with respect to said inner cladding wherein 2d is an outside diameter of the inner cladding.

Herein the segmented-core type refractive index profile, the relative refractive index difference of each glass region with respect to the inner cladding is defined as follows:

$$\Delta n_x = (n_x^9 - n_{old}^9)/2n_x^9)$$

$$x = 1, 2, 3, 4$$

wherein $n_1$ is the refractive index of the inner core, $n_2$ is the refractive index of the intermediate core, $n_3$ is the refractive index of the outer core, and $n_4$ is the refractive index of the outer cladding.

Figure 11:
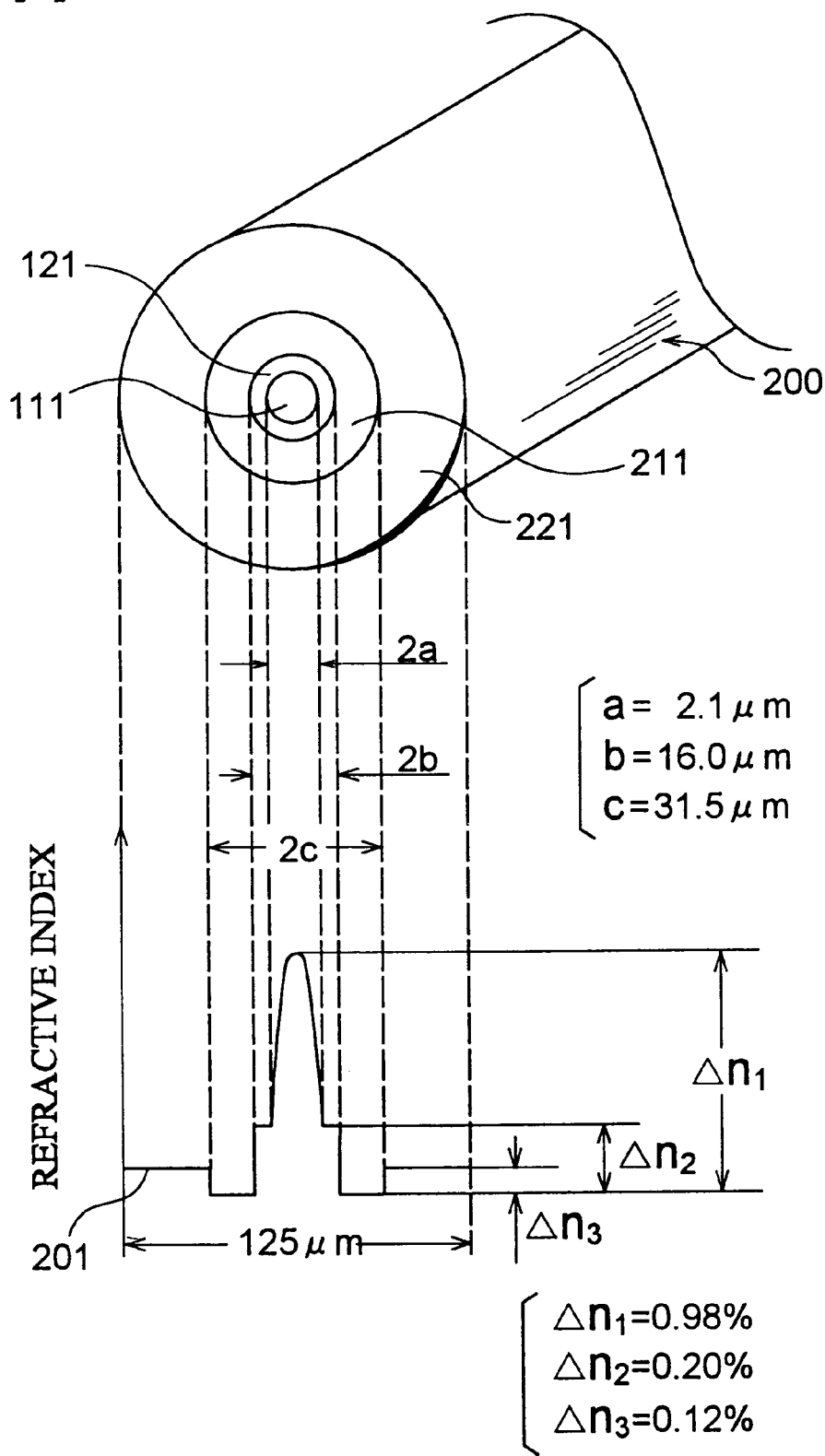
FIG. 11 is a view showing a cross-sectional configuration of a first embodiment of the dispersion-shifted fiber according to the present invention and its refractive index profile (depressed cladding/dual-shape core type)

FIG. 11 is a view showing a cross-sectional configuration of a first typical example (dual-shape core type) of a dispersion-shifted fiber according to the present invention and its refractive index profile. As shown in FIG. 11, the dispersion-shifted fiber 200 has a depressed cladding/dual-shape core type refractive index profile 201 and comprises an inner core 111 having an outside diameter of 4.2 μm; an outer core 121, disposed around the outer periphery of the inner core 111, having an outside diameter 2b of 32 μm; an inner cladding 211, disposed around the outer periphery of the outer core 122, having an outside diameter 2c of 63 μm; and an outer cladding 221 disposed around the outer periphery of the inner cladding 211.

Also, the first embodiment of the dispersion-shifted fiber 200 satisfies the above-mentioned relational expressions (1) to (4) and (8) as follows:

a/b=0.13<0.15

0.8%<Δn₁=0.98%<1.2%

0.12%<Δn₂=0.20%<0.30%

Δn₁=0.12%

Δn₃/Δn₂=0.6<0.95

1.2<c/b=1.97<3.5

Further, characteristics of the first embodiment of the dispersion-shifted fiber measured at the wavelength of 1,500 nm are as follows:
zero-dispersion wavelength=1,585 nm;
dispersion level at 1,550 nm=3.8 ps/nm/km;
dispersion slope=0.111 ps/nm²/km;
effective core cross-sectional area $A_{eff}$=78.2 μm;
cutoff wavelength=1.59 μm;
bending loss=0.1 dB/turn when bent at a diameter of 32 mm; and
transmission loss=0.21 dB/km.

Figure 12:
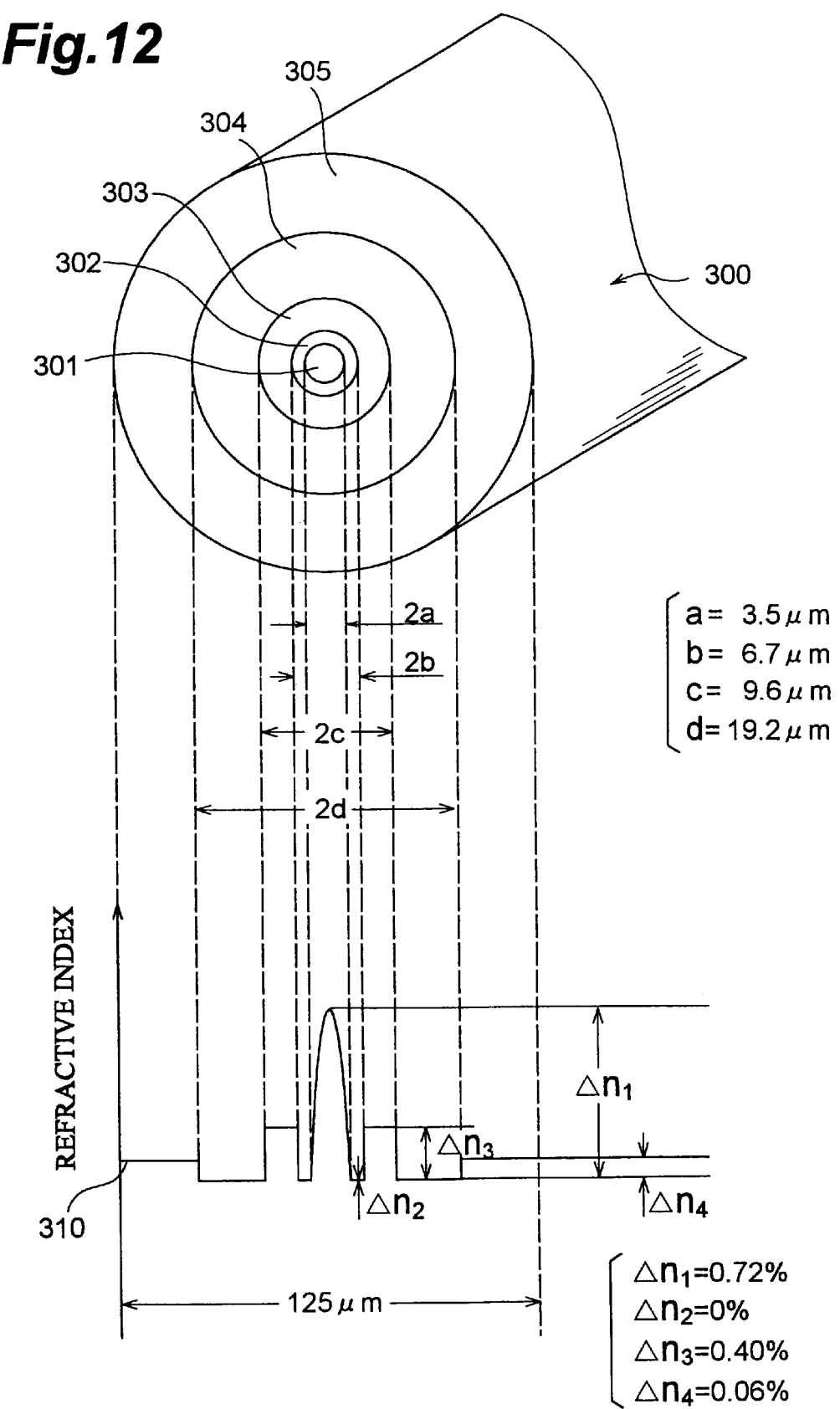
FIG. 12 is a view showing a cross-sectional configuration of a second embodiment of the dispersion-shifted fiber according to the present invention and its refractive index profile (depressed cladding/segmented-core type)

Next, FIG. 12 is a view showing a cross-sectional configuration of a second embodiment of the dispersion-shifted fiber according to the present invention and its refractive index profile. As shown in FIG. 12, the second embodiment of the dispersion-shifted fiber 300 has a segmented-core type refractive index profile and comprises an inner core 301 having an outside diameter 2a of 7.0 μm; an intermediate core 302, disposed around the outer periphery of the inner core 301, having an outside diameter 2b of 13.4 μm; an outer core 303, disposed around the outer periphery of the intermediate core 302, having an outside diameter 2of 19.2 μm; and inner cladding 304, disposed around the outer periphery of the outer core 303, having an outside diameter 2d of 38.4 μm; and an outer cladding 305 disposed around the outer periphery of the inner cladding 304.

Also, the second embodiment of the dispersion shifted fiber 300 satisfies the above-mentioned relational expressions (9) to (14) as follows:

a/e=0.36<0.42 b/c=0.7>0.60

0.5%<Δn₁=0.72%<1.1%

0.2%<(Δn₃-Δn₂)=0.4%<0.7%

Δn₄/Δn₃=0.15>0.95

1.2<d/c=2<3.5

Figure 13:
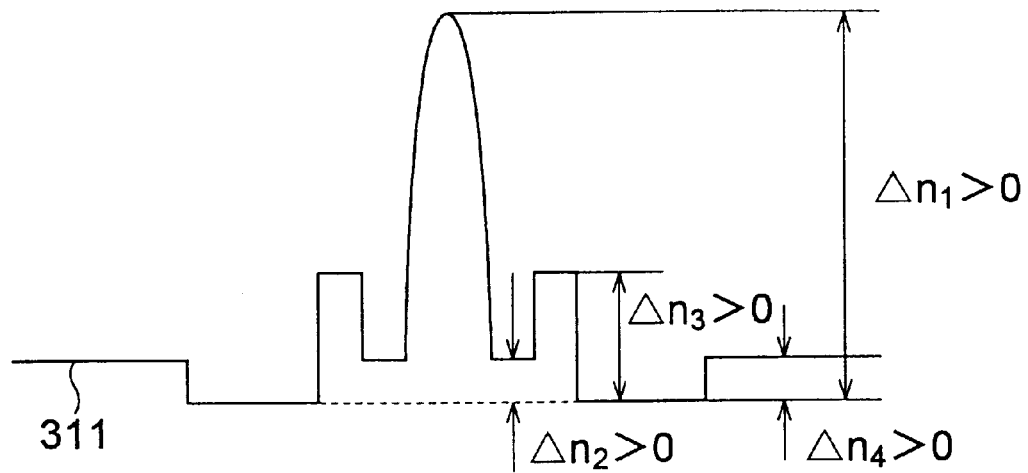
FIG. 13 is a view showing a first application of the depressed cladding/segmented core type refractive index profile in the second embodiment of the dispersion-shifted fiber shown in FIG. 12.
Figure 14:
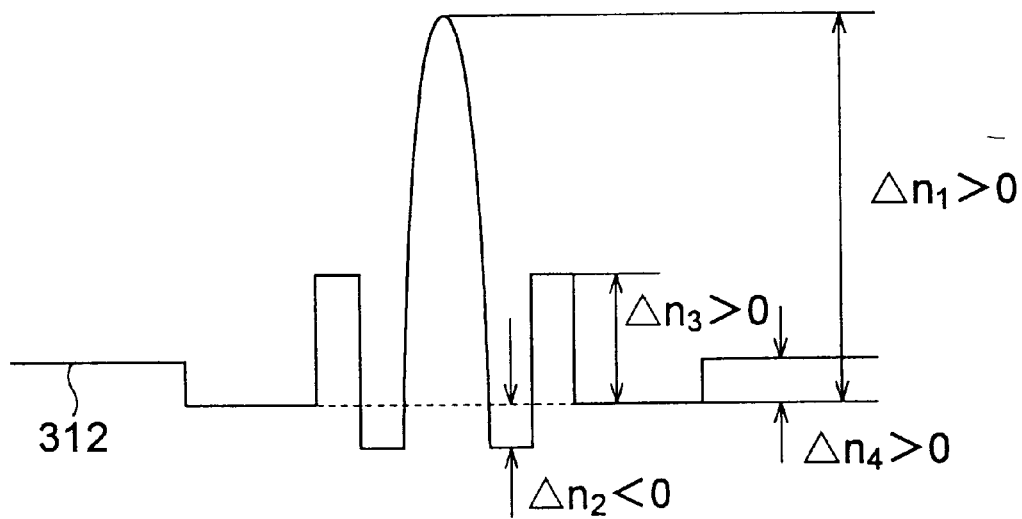
FIG. 14 is a view showing a second application of the depressed cladding/segmented-core type refractive index profile in the second embodiment of the dispersion-shifted fiber shown in FIG. 12.

Also, the depressed cladding/segmented-core type refractive index profile can be modified in various manners as shown in FIGS. 13 and 14. For example, FIG. 13 shows a first application of the depressed cladding/segmented-core type refractive index profile at the condition that the refractive index of the intermediate core 302 is higher than that of the inner cladding 304 (Δn₂>0), and FIG. 14 shows a second application of the depressed cladding/segmented-core type refractive index profile at the condition that the refractive index of the intermediate core 302 is lower than that of the inner cladding 304 (Δn₂<0).

Further, characteristics of the second embodiment of the dispersion-shifted fiber measured at the wavelength of 1,550 nm are as follows:
zero-dispersion wavelength=1,567 nm;
dispersion level at 1,550 nm=−1.8 ps/nm/km;
dispersion slope=0.110 ps/nm²/km;
effective core cross-sectional area $A_{eff}$=81.8 μm;
cutoff wavelength=1.74 μm;
bending loss=0.1 dB/turn when bent at a diameter of 32 mm; and
transmission loss=0.21 dB/km.

As explained in detail in the foregoing, in the dispersion-shifted fiber according to the present invention, its zero-dispersion wavelength does not exist at least within the wavelength range of 1.58 to 1.56 μm, while its effective core cross-sectional area is set to 70 μm² or greater, nonlinear optical effects are effectively restrained from occurring. Accordingly, it is possible to favorably realize a dispersion-shifted fiber, suitable for long-haul light transmission, which can effectively restrain the nonlinear optical effects from occurring.

Also, as the dispersion-shifted fiber according to the present invention has a configuration with a depressed cladding/dual-shape core type refractive index profile or a segmented-core type refractive index profile, it can reduce bending loss and favorably realize the aimed dispersion-shifted fiber.

Form the invention thus described, it will be obvious that the implementation of the invention may be varied in many ways. Such variations are not to be regarded as a departure from the spirit and scope of the invention, and all such modifications as would be obvious to one skilled in the art are intended for inclusion within the scope of the following claims.

What is claimed is:

1. A dispersion-shifted fiber having a zero-dispersion wavelength out of a wavelength band of 1.53 to 1.56 μm and having as characteristics at a wavelength of 1,550 nm;
   a dispersion level of 1.0 to 4.5 ps/nm/km in terms of absolute value;

a dispersion slope not greater than 0.13 ps/nm²/km in terms of absolute value;

an effective core cross-sectional area not less than 70 μm²; and a transmission loss not greater than 0.25 dB/km with respect to light in a 1.55-μm wavelength band.

2. A dispersion-shifted fiber according to claim 1, wherein said dispersion-shifted fiber comprises:

an inner core having a predetermined refractive index and an outside diameter of 2a;

an outer core disposed around the outer periphery of said inner core, said outer core having a refractive index lower than that of said inner core and an outside diameter of 2b;

an inner cladding disposed around the outer periphery of said outer core, said inner cladding having a refractive index lower than that of said outer core; and an outer cladding disposed around the outer periphery of said inner cladding, said outer cladding having a refractive index higher than that of said inner cladding.

3. A dispersion-shifted fiber according to claim 2, wherein said dispersion-shifted fiber satisfies the following relationships:

$$a/b \leq 0.15$$

$$0.9\% \leq \Delta n_1 \leq 1.2\%$$

$$0.12\% < \Delta n_2 \leq 0.30\%$$

$$\Delta n_3/\Delta n_2 \leq 0.95$$

wherein $\Delta n_1$ is a relative refractive index difference of said inner core with respect to said inner cladding, $\Delta n_3$ is a relative refractive index difference of said outer core with respect to said inner cladding, and $\Delta n_3$ is a relative refractive index difference of said outer cladding with respect to said inner cladding.

4. A dispersion-shifted fiber according to claim 3, wherein said dispersion-shifted fiber satisfies the following relationship:

$$1.2 \leq c/b \leq 3.5$$

wherein 2c is an outside diameter of said inner cladding.

5. A dispersion-shifted fiber according to claim 1, wherein said dispersion-shifted fiber comprises:

an inner core having a predetermined refractive index and an outside diameter of 2a;

an intermediate core disposed around the outer periphery of said inner core, a said intermediate core having a refractive index lower than that of said inner core and an outside diameter of 2b;

an outer core disposed around the outer periphery of said intermediate core, said outer core having a refractive index lower than that of said intermediate core and an outside diameter of 2c;

an inner cladding disposed around the outer periphery of said outer core, said inner cladding having a refractive index lower than that of said outer core; and an outer cladding disposed around the outer periphery of said inner cladding, said outer cladding having a refractive index higher than that of said inner cladding.

6. A dispersion-shifted fiber according to claim 5, wherein said dispersion-shifted fiber satisfies the following relationships:

$$a/c \leq 0.42$$

$$b/c \geq 0.60$$

$$0.5\% < \Delta n_1 \leq 1.1\%$$

$$0.2\% \leq \Delta n_3 \Delta n_2 < 0.7\%$$

$$\Delta n_1/\Delta n_3 \leq 0.95$$

wherein $\Delta n_1$ is a relative refractive index difference of said inner core with respect to said inner cladding, $\Delta n_2$ is a relative refractive index difference of said intermediate core with respect to said inner cladding, $\Delta n_3$ is a relative refractive index difference of said outer core with respect to said inner cladding, and $\Delta n_4$ is a relative refractive index difference of said outer cladding with respect to said inner cladding.

7. A dispersion-shifted fiber according to claim 6, wherein said dispersion-shifted fiber satisfies the following relationship:

$$1.2 \leq d/c \leq 3.5$$

wherein 2d is an outside diameter of said inner cladding.

8. A dispersion-shifted fiber according to claim 1, wherein said dispersion-shifted fiber has a bending loss not greater than 0.5 dB/turn with respect to light in the 1.55-μm wavelength band when bet at a diameter of 32 mm.

9. A dispersion-shifted fiber according to claim 1, wherein said dispersion-shifted fiber has a dispersion slope in terms of absolute value not less than 0.09 ps/nm²/km at the wavelength of 1,550 nm.

10. A dispersion-shifted fiber having a zero-dispersion wavelength out of a wavelength band of 1.53 to 1.56 μm and having:

a dispersion level of 1.0 to 4.5 ps/nm/km in terms of absolute value at a wavelength of 1,550 nm; and a transmission loss not greater than 0.25 dB/km with respect to light in a 1.55-μm wavelength band;

wherein said dispersion-shifted fiber comprises a core region and a cladding region, said cladding region comprising:

an inner cladding disposed around the outer periphery of said core region; and an outer cladding disposed around the outer periphery of said inner cladding, said outer cladding having a refractive index higher than that of said inner cladding.

an effective area not less than 70 μm² at the wavelength of 1,

11. A dispersion-shifted fiber according to claim 10, wherein said core region comprises:

an inner core having a predetermined refractive index and an outside diameter of 2a;

an intermediate core disposed around the outer periphery of said inner core, said intermediate core having a regractive index lower than that of said inner core and an outside diameter of 2b; and an outer core disposed around the outer periphery of said intermediate core, said outer core having a refractive index higher than that of said intermediate core and an outside diameter of 2c.

12. A dispersion-shifted fiber according to claim 11, wherein said dispersion-shifted fiber satisifies the following relationships:

$$a/c \leq 0.42$$

$$b/c \leq 0.60$$

$$0.5\% \leq \Delta n_1 \leq 1.1\%$$

$$0.2\% \leq \Delta n_2 \leq 0.7\%$$

$$\Delta n_4/\Delta n_3 \leq 0.95$$

wherein $\Delta n_1$ is a relative refractive index difference of said inner core with respect to said inner cladding, $\Delta n_2$ is a relative refractive index difference of said intermediate core with respect to said inner cladding, $\Delta n_3$ is a relative refractive index difference of said outer core with respect to said inner cladding, and $\Delta n_4$ is a relative refractive index difference of said outer cladding with respect to said inner cladding.

13. A dispersion-shifted fiber according to claim 12, wherein said dispersion-shifted fiber satisfies the following relationship:

$$1.2 \leq d/c \leq 3.5$$

wherein 2d is an outside diameter of said inner cladding.

14. A dispersion-shifted fiber according to claim 10, wherein said core region comprises:
   an inner having a predetermined refractive index and an outside diameter of 2a; and
   an outer core disposed around the outer periphery of said inner core, said outer core having a regractive index lower than that of said inner core and an outside diameter of 2b.

15. A dispersion-shifted fiber according to claim 14, wherein said dispersion-shifted fiber satisfies the following relationships:

$$a/b \leq 0.15$$

$$0.8\% \leq \Delta n_1 \leq 1.2\%$$

$$0.12\% \leq \Delta n_2 \leq 0.30\%$$

$$\Delta n_3/\Delta n_2 \leq 0.95$$

wherein $\Delta n_1$ is a relative refractive index difference of said inner core with respect to said inner cladding, $\Delta n_2$ is a relative refractive index difference of said outer core with respect to said inner cladding, and $\Delta n_3$ is a relative index difference of said outer cladding with respect to said inner cladding.

16. A dispersion-shifted fiber according to claim 15, wherein said dispersion-shifted fiber satisfies the following relationship:

wherein 2c is an outside diameter of said inner cladding.

17. A dispersion-shifted fiber according to claim 10, wherein said dispersion-shifted fiber has a bending loss not greater than 0.5 dB/turn with respect to light in the 1.55-μm wavelength band when bent at a diameter 32 mm.

18. A dispersion-shifted fiber according to claim 10, wherein said dispersion-shifted has a dispersion slope in terms of absolute value not less than 0.09 ps/nm$^2$/km at the wavelength of 1,550 nm.

* * * * *

UNITED STATES PATENT AND TRADEMARK OFFICE
CERTIFICATE OF CORRECTION

PATENT NO.   : 6,072,929
DATED         : June 6, 2000
INVENTOR(S)  : Kato et al

It is certified that error appears in the above-identified patent and that said Letters Patent is hereby corrected as shown below:

Claim 1, column 12,
Line 65, change "as characteristics at a wavelength of 1,550 nm;" to --: --,
Line 67, after "value" insert --at a wavelength of 1,550 nm--; --

Column 13,
Line 2, after "value" insert --at the wavelenth of 1,550 nm--; --;
Line 3, delete "core cross-sectional";
Line 3, change ";" to --at the wavelength,of 1,550 nm;--
Line 4, delete "and";
Line 6, change "band." to --band; and--;
After line 6, insert the following paragraph --a cutoff wavelength at a length of
2m is not less than 1.59 μm and not greater than 2.2 μm.--.

Claim 2, column 13,
Line 7, change "according to claim 1" to --having a zero-dispersion wavelength out of a wavelength band of 1.53 to 1.56 μm and having:
    a dispersion level of 1.0 to 4.5 ps/nm/km in terms of absolute, value at a wavelength of 1,550 nm;
    a dispersion slope not greater than 0.13 ps/nm$^2$/krm in terms of absolute value at the wavelength of 1,550 nm;
    an effective area not less than 70 μm$^2$ at the wavelength of 1,550 nm;
    a transmission loss not greater than 0.25 dB/km with respect to light in a 1.55-μm wavelength band; and
    a cutoff wavelength of 1.5 to 2.2 μm at a length of 2m--;

Claim 3, column 13,
Line 30, change "0.12%<Δn$_2$≤0.3%" to --0.12% ≤Δn$_2$≤ 0.3%--.

Claim 5, column 13,
Line 46, change "according to claim 1" to --having a zero-dispersion wavelength out of a wavelength band of 1.53 to 1.56 μm and having:
    a dispersion level of 1.0 to 4.5 ps/nm/km in terms of absolute value at the wavelength of 1,550 mm;

UNITED STATES PATENT AND TRADEMARK OFFICE
CERTIFICATE OF CORRECTION

PATENT NO. : 6,072,929
DATED : June 6, 2000
INVENTOR(S) : Kato et al

It is certified that error appears in the above-identified patent and that said Letters Patent is hereby corrected as shown below:

a dispersion slope not greater than 0.13 ps/nm$^2$/km in terms of absolute value at the wavelength of 1,550 nm;
　　　　an effective area not less than 70 μm$^2$ at the wavelength of 1,550 nm;
　　　　a transmission loss not greater than 0.25 dB/km with respect to light in a 1.55-μm wavelength band; and
　　　　a cutoff wavelength of 1.5 to 2.2 μm at a length of 2 m--;
line 51, change "a said" to --said--;
line 56, change "lower" to --higher--.

Claim 6, column 14,
Line 5, change "0.5% <$\Delta n_1 \leq$1.1% to --0.5%$\leq \Delta n_1 \leq$1.1%-- .--
Line 7 change "0.2%$\leq \Delta n_3 \Delta n_2 \leq$0.7%" to --0.2%$\leq \Delta n_3 - \Delta n_2 \leq$0.7%--.

Claim 8, column 14,
Line 29, change "bet" to --bent--.

Claim 10, column 14,
Line 38, change "and" to
　　　　--a dispersion slope not greater than 0.13 ps/nm$^2$/km in tems of absolute value at the wavelength of 1,550 nm;
　　　　an effective area not less than 70 μm$^2$ at the wavelength of 1,550 nm; and--.

Between Claims 10 and 11, column 14,
Lines 51-52, delete "an effective area not less than 70 μm$^2$ at the wavelength of 1,".

Claim 11, column 14,
Line 59, change "regractive" to --refractive--.

Claim 12, column 15,
Line 4, change "b/c$\leq$0.60" to --b/c$\geq$0.6--;
Line 8, change "0.2%$\leq \Delta n_2 \leq$0.7%" to --0.2%$\leq \Delta n_3 - \Delta n_2 \leq$0.7%.

UNITED STATES PATENT AND TRADEMARK OFFICE
CERTIFICATE OF CORRECTION

PATENT NO. : 6,072,929
DATED : June 6, 2000
INVENTOR(S) : Kato et al

It is certified that error appears in the above-identified patent and that said Letters Patent is hereby corrected as shown below:

Claim 14, column 15,
Line 29, before "having" insert --core--
Line 32, change "regractive" to --refractive--.

Claim 15, column 16,
Line 17, before "index" insert --refractive--.

Claim 16, column 16,
Line 22, after "relationship:" on a separate line, insert:
$--1.2 \leq c/b \leq 3.5--$.

Signed and Sealed this

Twenty-first Day of August, 2001

Attest:

NICHOLAS P. GODICI
*Attesting Officer*  *Acting Director of the United States Patent and Trademark Office*